United States Patent [19]

Hutton

[11] 3,976,091
[45] Aug. 24, 1976

[54] PIPE TAPPING TOOL
[76] Inventor: Walter C. Hutton, 10360 Peach Ave., Hesperia, Calif. 92345
[22] Filed: May 29, 1975
[21] Appl. No.: 581,826

[52] U.S. Cl. ............................... 137/318; 408/92; 408/104
[51] Int. Cl.² ................................. F16K 43/00
[58] Field of Search ............ 137/317, 318; 138/94; 408/92, 103, 104

[56] References Cited
UNITED STATES PATENTS

| | | | |
|---|---|---|---|
| 485,717 | 11/1892 | Smith | 137/318 |
| 798,722 | 9/1905 | Wright | 408/104 |
| 2,219,997 | 10/1940 | Morangelo | 408/92 |
| 2,476,907 | 7/1949 | Preston et al. | 138/94 |
| 3,120,246 | 2/1964 | Alter | 138/94 |
| 3,516,426 | 6/1970 | Toll | 137/318 |
| 3,646,954 | 3/1972 | Hutton | 137/318 |
| 3,756,267 | 9/1973 | Hutton | 137/318 |

Primary Examiner—Martin P. Schwadron
Assistant Examiner—George L. Walton
Attorney, Agent, or Firm—Edward D. O'Brian

[57] ABSTRACT

The problem of seals not functioning properly with known service tapping tools can be solved through the use of interfitting yokes and fasteners holding these yokes in securing such tools relative to couplings on branch or service lines. Such tapping tools are constructed so as to each include a plug structure adapted to internally fit in sealed relationship within the interior of a branch line and/or coupling on the same, a boring bar mounted on the plug structure so as to extend through the plug structure and so as to be linearly and rotatably mounted with respect to the plug structure, an appropriate cutting tool held by the boring bar, and a mechanism for holding the plug relative to the branch line, such mechanism normally being constructed so as to engage the coupling on the branch line. When a yoke and fastener structure as referred to in the preceding is used the plug structure is held so that it cannot cock in such a manner as to affect the sealing at the exterior of the plug structure.

4 Claims, 8 Drawing Figures

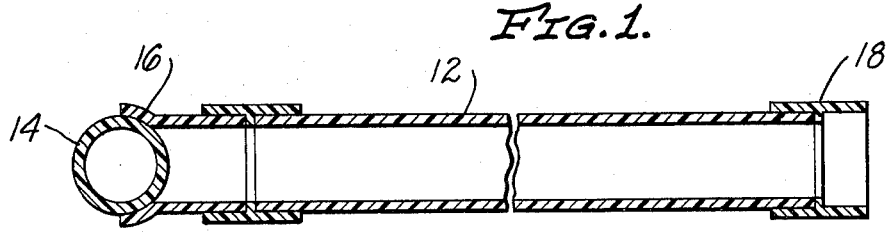
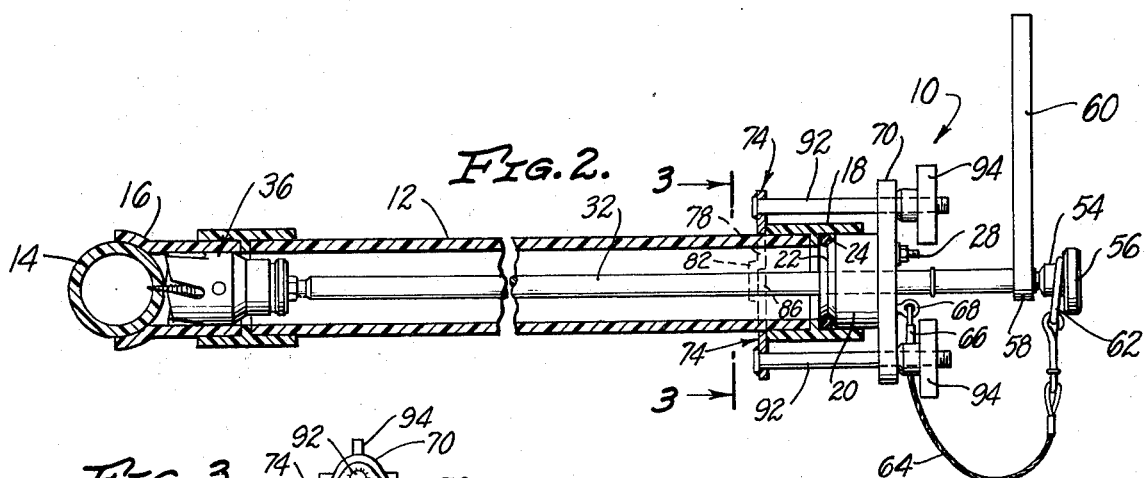
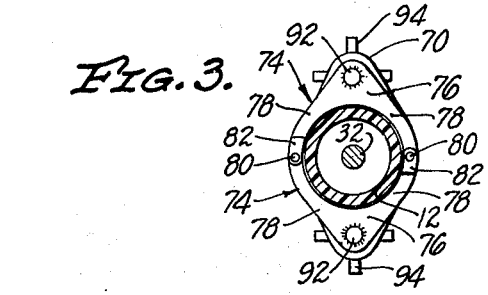
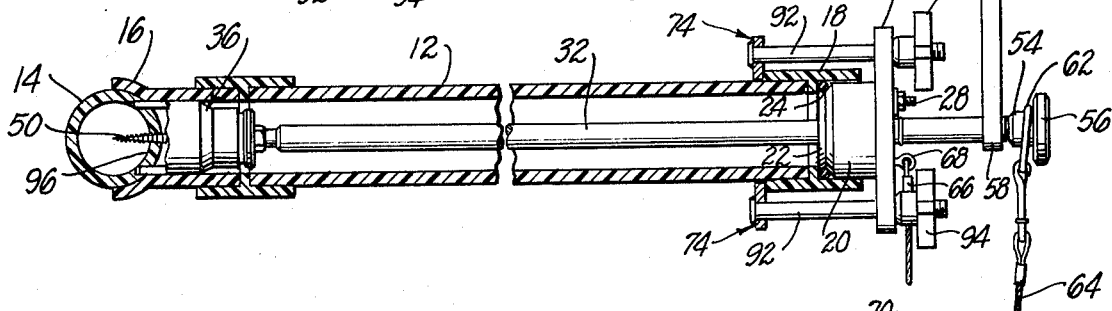
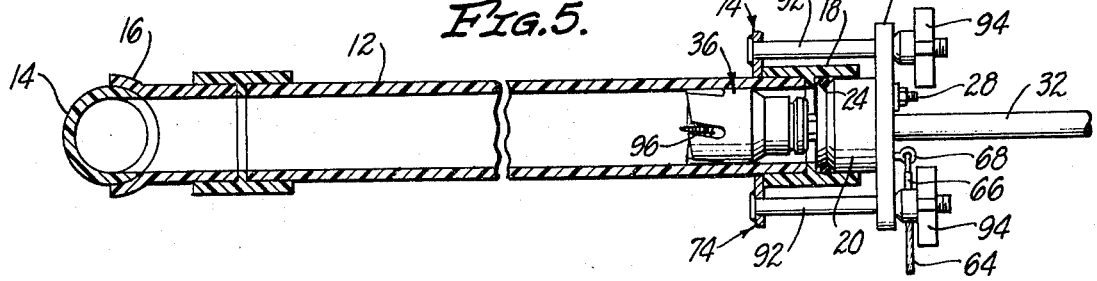

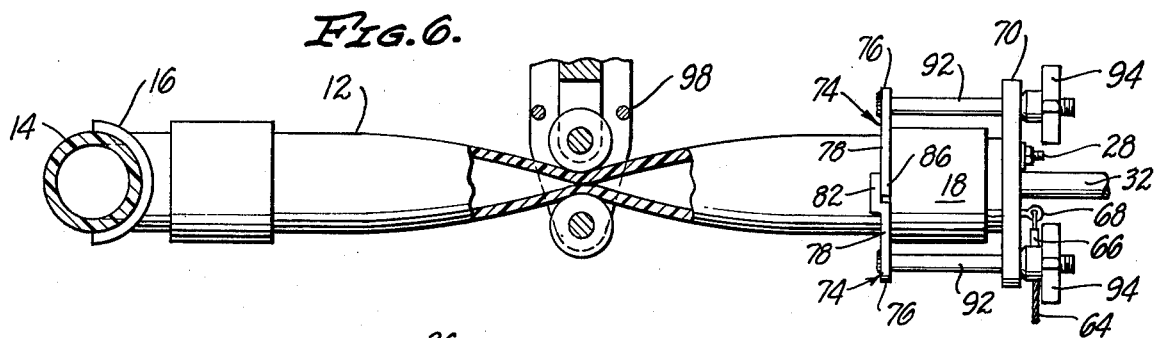
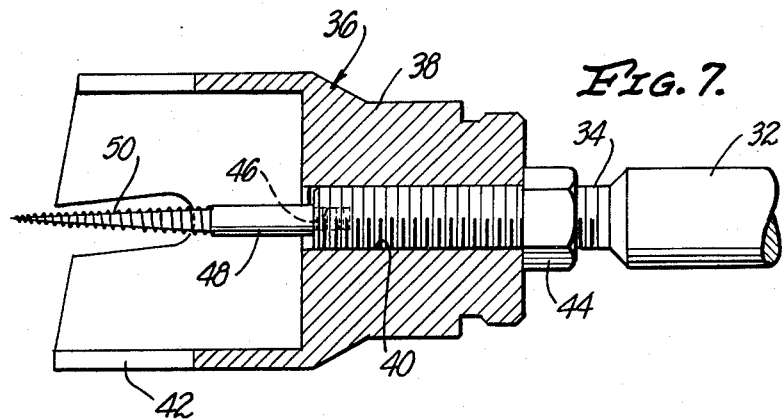
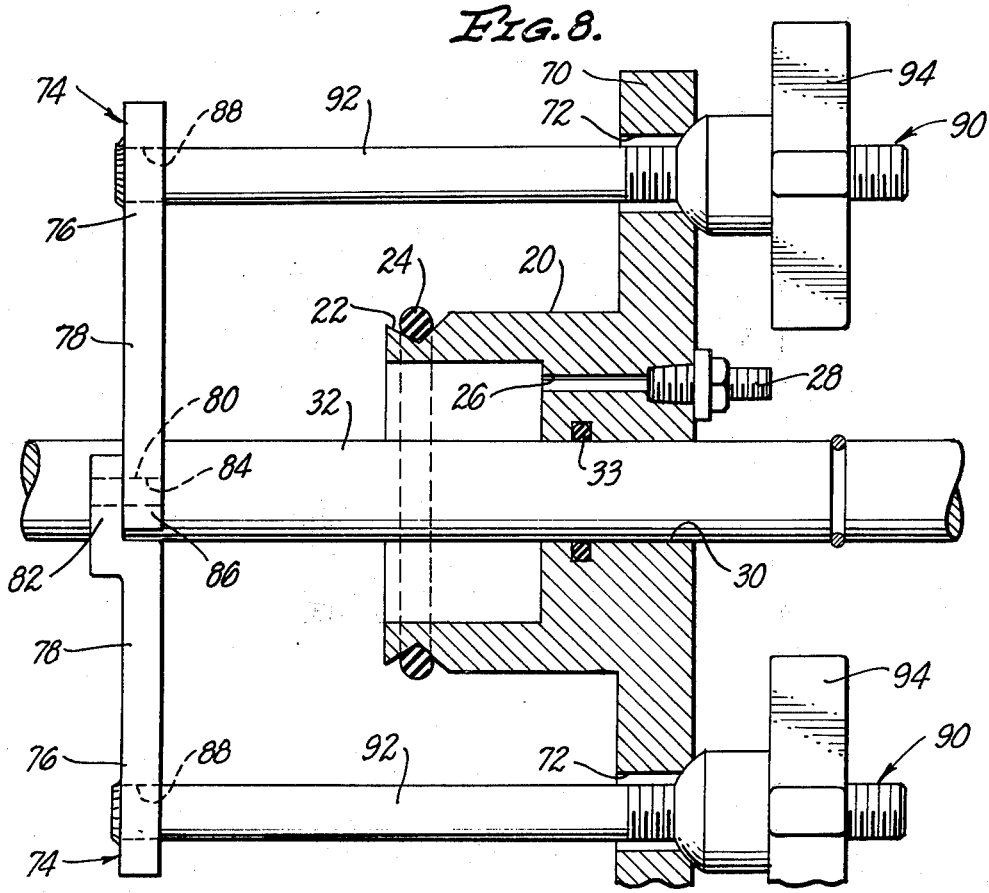

PIPE TAPPING TOOL

REFERENCE TO RELATED PATENTS

Walter C. Hutton U.S. Pat. No. 3,646,954 issued Mar. 7, 1972, entitled "SERVICE TAP TOOL"; and Walter C. Hutton U.S. Pat. No. 3,756,267, issued Sept. 4, 1973, entitled "SERVICE TAP TOOL".

BACKGROUND OF THE INVENTION

The invention set forth in this application pertains to new and improved pipe tapping tools which are especially adapted to be used in making so-called "hot taps" through a lateral or branch pipe into a main pipeline or distribution conduit.

The utility of the present invention is best explained by briefly referring to the manner in which various fluids such as natural gas and the like are commonly distributed. Normally such fluids are distributed through a main pipeline or conduit extending under a road or street. Such a fluid is normally distributed to individual users through a branch pipe or lateral extending off of such a conduit at various locations. As such principal pipes or conduits are installed frequently no laterals are connected to them since it is frequently unknown as to where such branch pipes or laterals should be located. Frequently after such a principal pipe or conduit is in use branch pipes or laterals are secured to it at various locations and holes are drilled or bored from the interior of the branches or laterals so as to establish fluid communication.

Such a process is referred to as "tapping" into the principal pipe or conduit. Such a tapping operation is frequently referred to as a "hot tapping operation" when the principal pipe or conduit contains a fluid such as gas under pressure. Specialized equipment has been developed for making so-called "hot taps" since it is necessary to prevent the loss of pressure from the principal pipe or conduit as a hole is being established between the lateral and such principal pipe or conduit. Such a tool either must be constructed in such a manner or utilized with auxiliary equipment so that the tapping part of the tool can be withdrawn from the lateral and so that the lateral may be connected up with an appropriate supply line or pipe without fluid escaping from the piping system.

In the past a number of different types of tools have been developed for making so-called hot taps. A recognition of the unique character of so-called "plastic" polymer pipes and a recognition of the desirability of using such pipe in distributing various different diverse fluids has resulted in a recognition of the desirability of utilizing tapping tools which are specifically adapted to be used with such plastic pipe. A number of such hot tapping tools for use with plastic pipe have been developed and to various extents used. An understanding of the present invention is not considered to require a detailed consideration of such prior specialized tools for use in making hot taps with plastic pipe.

However, it is considered important to note that the invention set forth in this specification is an outgrowth of sealing problems encountered with certain of such structures. Such structures have been constructed so as to utilize a plug-type body carrying appropriate sealing rings which is dimensioned so as to fit within an end of such a service branch or lateral so as to form a seal with the interior of it. These prior hot tapping tools have used a boring bar rotatably supported by such a plug-type body in such a manner as to be capable of being moved linearly and have used various different structures for mounting such a plug-type body against linear movement on a lateral or branch pipe both during manipulation of the boring bar and after a hole has been created in the principal distribution pipe or conduit.

The sealing problem encountered with such prior hot tapping tools has been determined to be normally related to such mounting structures. More specifically it has been found that such mounting structures have held the plug-type bodies indicated in the preceding discussion in such a manner that under service or use conditions such plug-type bodies have been capable of shifting slightly relative to a service pipe or lateral to a sufficient extent so as to affect the operation of the sealing rings carried by such a plug-type body. While in one sense the amount of leakage on occasion encountered as the result of this is minor, in another sense such leakage is quite significant. This is best illustrated with reference to the use of hot tapping tools in making hot taps into lines containing a fluid such as natural gas under pressure. The escape of even a small amount of such gas as the result of a seal improperly functioning can easily create a severely hazardous situation.

SUMMARY OF THE INVENTION

It is believed that it will be apparent from the preceding that there is a need for improvement in hot tapping tools for use in making hot taps through branch pipes or laterals into a principal conduit or line containing fluid under pressure. A broad objective of the present invention is to fulfill this need. A more specific objective of the invention is to provide pipe tapping tools as herein indicated which can be satisfactorily used in making hot taps through plastic polymer pipe without significant fear or danger of leakage occurring. Further objectives of the invention are to provide pipe tapping tools which may be constructed at a comparatively nominal cost, which may be easily and conveniently used, and which are capable of operating satisfactorily.

In accordance with this invention these and various other objectives of the invention as will be apparent from a careful consideration of this specification are achieved by providing a pipe tapping tool having a plug means adapted to fit internally within a branch pipe, a boring bar mounted on the plug means so as to be capable of being linearly or rotatably moved with respect to the plug means and so as to extend through the plug means, boring means mounted on one end of the boring bar, a mounting member secured to the plug means and extending outwardly therefrom and holding means carried by the mounting means for securing the plug means to a branch pipe by the improvement which comprises: these holding means comprising two interfitting yokes adapted to fit around the exterior of the branch pipe so that their extremities are locked together and a separate fastener securing the base of each of the yokes to the mounting means, these fasteners being located on diametrically opposite sides of the branch pipe when the tool is installed.

BRIEF DESCRIPTION OF THE DRAWINGS

The invention is of such a character that it is best more fully explained with reference to the accompanying drawings in which:

FIG. 1 is a cross-sectional view showing a main pipe or conduit and a connected branch pipe or lateral secured to the main pipe prior to the main pipe being tapped;

FIG. 2 shows the assemblage of pipes indicated in FIG. 1 in cross-section with a tool of the present invention mounted in an in-use position on such pipes;

FIG. 3 is a cross-sectional view taken at line 3—3 of FIG. 2;

FIGS. 4 and 5 are views corresponding to FIG. 2 indicating the utilization of the tapping tool of the invention;

FIG. 6 is a side elevational view, partially in section, indicating the closing off of a branch pipe or lateral after a tap has been made prior to the tool being removed from the branch of the lateral;

FIG. 7 is an enlarged cross-sectional view at an enlarged scale indicating the boring means preferably used with the tool as described; and FIG. 8 is a partial cross-section view at an enlarged scale indicating parts of a pipe tapping tool of the invention in elevation.

The pipe tapping tool illustrated in the drawings is a presently preferred structure or embodiment utilizing the principles and features of the invention set forth in detail in the appended claims. It is believed that it will be apparent to those skilled in the design of various tapping tools that these principles or features may be easily embodied within a variety of differently appearing tapping tools to be used through the exercise of routine design skill in the field of this invention.

DETAILED DESCRIPTION

A pipe tapping tool 10 of the present invention is intended to be utilized with a branch pipe or lateral 12 which is connected in a sealed relationship with a principal pip or line 14 through a conventional type connection 16. This lateral 12 is provided with a terminal collar 18 located remote from the pipe 14. The tool 10 itself is constructed so as to include a centrally located cylindrical body 20 which is used as a plug or plug means and which is adapted to fit closely within the collar 18 so as to close off the interior of this collar 18. A groove 22 on the exterior of the body 20 carries a conventional elastomeric "O" ring seal 24 which is adapted to be held under compression between the exterior of the body 20 and the interior of the collar 18. A small hole 26 extends through the body 20 so that after the body 20 and the remainder of the tool 10 are positioned in place in the lateral 12, this lateral 12 can be connected to a source of fluid under pressure (not shown) so as to be tested for leakage. An appropriate conventional fitting 28 is mounted on the body 20 in communication with the hole 26 so as to facilitate this connection.

The body 20 also is provided with a centrally located bore 30 which carries an elongated boring rod 32 in such a manner that this boring rod 32 may be rotated and may also be moved linearly with respect to the body 20. The rod 32 extends co-axially with the body 20. A conventional "O" ring seal 33 is preferably located in the interior of the base 30 so as to seal against leakage around the rod 32.

One end 34 of the rod 32 is threaded so as to facilitate a cup shaped hole cutter 36 being mounted on the rod 32. This hole cutter 36 includes a base 38 having a centrally located threaded opening 40; it also includes a conventional cylindrical cutter element 42. The position of the cutter 36 on the end 34 may conveniently be regulated through the use of a conventional nut 44 threaded on this end 34. Preferably the end 34 also includes an internal axially aligned threaded cavity 46 which is adapted to receive and hold a threaded shank 48 on an elongated self-tapping type screw 50.

The end 54 of the rod 32 remote from the end 34 carries a handle 56 which may be conveniently used in linearly moving the rod 32. This end 54 also includes a conventional ratchet assembly 58 to which there is attached a conventional actuating lever 60. If desired a loop 62 on a restraining strap 64 may be loosely held about the end 54 between the handle 56 and the lever 60 for the purpose of preventing the pressure from within the pipe 14 from forcing the boring rod 32 back against the body 20 as the tool 10 is used. Although the end 66 of the strap 64 may be secured in any obvious way so as to render the strap 64 operative for this purpose, it is preferred to secure the end 66 to the body 20 by means of an eye 68.

The body 20 carries what may be referred to as a mounting member 70. This mounting member 70 in the embodiment of the invention illustrated consists of an outwardly extending flange (not separately numbered) carried by the body 20. This flange 70 is provided with two holes 72 located diametrically opposite from one another on opposite sides of the bore 30 at equidistances from the axis (not labeled) of the bore 30. The tool 10 is also provided with two identical yokes 74, each of which has a base 76 and diverging arms 78 extending from its base 76.

These arms 78 are shaped so as to fit closely around the exterior of the lateral 12. Thus, the interiors (not separately numbered) of these arms 78 may be described as circular. The arms 78 on each of the yokes 74 fit 180° around the lateral 12. These arms 78 are dimensioned so that when the yokes 74 are assembled together they will abut against the collar 18 in such a manner that the collar 18 acts as a stop. The yokes 74 are assembled through the use of a pin 80 on an offset end 82 on one of the arms 78 of each of the yokes 74 fitting through a hole 84 in the other end 86 of the other of the arms 78 on the other of the yokes 74.

The bases 76 of the yokes 74 are provided with holes 88 which are diametrically opposite one another when the yokes 74 are assembled and which are also equidistant from the axis of the body 20 and the bore 30 as the tool 10 is assembled and used. These yokes 74 are held relative to the flange 70 by conventional fasteners 90. These fasteners 90 take the form of threaded bolts 92 which pass through the holes 88 and the holes 72 and conventional hand nuts 94 adapted to be manually tightened threaded upon the bolts 92. The bolts 92 are welded to the yokes 74.

The operation of the tool 10 is essentially very simple. Prior to this tool 10 being used a lateral such as the lateral 12 will be assembled upon a principal conduit such as the line or pipe 14 in a conventional manner as indicated in FIG. 1 of the drawing. The tool 10 will then be located upon the lateral 12 as indicated in FIG. 2 so that the body 20 abuts the lateral 12 and so that the yokes 74 are tightly against the collar 18.

Then as the handle 56 is manually pressed the lever 60 will be manually actuated so as to cause the screw 50 to engage and bite into the pipe 14 as indicated in FIG. 4. As the tool 10 is operated further in this manner the pressure applied to the handle 46 and the action of the screw 50 will cause the cutter 36 to tap into the pipe 14 by severing a plug 96 from the pipe 14. As this plug 96 is severed fluid under pressure from within the pipe 14 will escape into the lateral 12 and the cutter 36 and the boring rod 32 will be moved toward the body 20.

Pressure will concurrently be applied to the body 20 tending to move it generally away from the collar 18. Such movement will be resisted because of the action of the flange 70, the fasteners 90 and the yokes 74 opposing such motion as the result of the yokes 74 having been placed in engagement with the collar 18 prior to the tool 10 being used. This condition is illustrated in FIG. 5. Thereafter the lateral 12 may be pinched off as shown in FIG. 6 with a known pinching tool 98 so as to close off the escape of fluid from within the pipe 14. At this point the tool 10 may be disassembled and removed from the lateral 12. Subsequently a conventional connection to a service line (not shown) may be made through the use of the collar 18.

This tool 10 is considered to be particularly effective because with it a balance of forces may be achieved which tends to prevent cocking of the body 20. Such cocking —if it should occur —would tend to cause leakage around the "0" ring 24. This is effectively avoided with the present invention through the use of what is a simple, effective, easily constructed and used tool.

I claim:

1. A tapping tool for boring a hole in a main pipe so as to place the interior of said main pipe in communication with a branch pipe connected to said main pipe so as to extend outwardly therefrom and having an outwardly extending coupling located on an end thereof remote from said main pipe, said tool having a plug means adapted to fit internally of said branch pipe in sealed relationship therewith, a boring bar mounted on said plug means so as to be capable of being linearly and rotatably moved with respect to said plug means, said boring bar being mounted on said plug means so as to extend through said plug means and so as to be capable of being moved through said branch pipe when said plug means is located within said branch pipe, a mounting member secured to said plug means and extending outwardly therefrom for engagement with said coupling and holding means carried by said mounting means for securing said tool to said branch pipe in which the improvement comprises:

said holding means comprising two yokes and a fastener securing each of said yokes to said mounting means, each of said yokes having two arms defining a semicircular interior capable of fitting closely around a part of the exterior of said branch pipe, each of said yokes including locking means on the extremities of the arms thereof, said locking means being capable of interfitting so as to hold said yokes relative to one another so that said yokes surround said branch pipe, said fasteners connecting the bases of said yokes with said mounting means.

2. A tapping tool as claimed in claim 1 wherein:
the extremities of said arms overlap and
said locking means comprise pins extending between said overlapping extremities of said arms.

3. A tapping tool as claimed in claim 1 wherein:
said mounting member is a flange extending outwardly from said plug means, said flange having holes located therein on diametrically opposite sides of said plug means, said holes being equidistant from the axis of said plug means, and
said fasteners comprise bolts extending from the bases of said yokes through said holes in said flange and nuts for tightening said bolts.

4. A tapping tool as claimed in claim 1 wherein:
the extremities of said arms overlap and
said locking means comprise pins extending between said overlapping extremities of said arms,
said mounting member is a flange extending outwardly from said plug means, said flange having holes located therein on diametrically opposite sides of said plug means, said holes being equidistant from the axis of said plug means, and
said fasteners comprise bolts extending from the bases of said yokes through said holes in said flange and nuts for tightening said bolts.

* * * * *